US012411198B2

(12) United States Patent
Wang

(10) Patent No.: US 12,411,198 B2
(45) Date of Patent: Sep. 9, 2025

(54) ROBOT ACCOMPANIMENT DEVICE AND FOUR-LEGGED ROBOT USING THE SAME

(71) Applicant: HangZhou YuShu TECHNOLOGY CO., LTD., Hangzhou (CN)

(72) Inventor: Xingxing Wang, Hangzhou (CN)

(73) Assignee: HANGZHOU YUSHU TECHNOLOGY CO., LTD., Hangzhou (CN)

( * ) Notice: Subject to any disclaimer, the term of this patent is extended or adjusted under 35 U.S.C. 154(b) by 381 days.

(21) Appl. No.: 18/020,507

(22) PCT Filed: Nov. 9, 2021

(86) PCT No.: PCT/CN2021/129433
§ 371 (c)(1),
(2) Date: Feb. 9, 2023

(87) PCT Pub. No.: WO2022/053078
PCT Pub. Date: Mar. 17, 2022

(65) Prior Publication Data
US 2023/0176157 A1 Jun. 8, 2023

(30) Foreign Application Priority Data
Sep. 11, 2020 (CN) .......................... 202021990050.6

(51) Int. Cl.
*G01S 17/931* (2020.01)
*B62D 57/032* (2006.01)
*G01S 3/40* (2006.01)
*G01S 3/48* (2006.01)
*G01S 5/00* (2006.01)

(52) U.S. Cl.
CPC .............. *G01S 3/48* (2013.01); *B62D 57/032* (2013.01); *G01S 3/40* (2013.01); *G01S 5/0072* (2013.01)

(58) Field of Classification Search
CPC ....... G01S 3/48; G01S 5/0072; B62D 57/032; G05D 1/661
See application file for complete search history.

(56) References Cited

U.S. PATENT DOCUMENTS

2007/0192910 A1* 8/2007 Vu .......................... H04N 7/142
901/1
2012/0022688 A1 1/2012 Wong et al.
(Continued)

FOREIGN PATENT DOCUMENTS

CN 105599821 A 5/2016
CN 106363625 B 3/2019
(Continued)

*Primary Examiner* — Cortez M Cook
(74) *Attorney, Agent, or Firm* — MUNCY, GEISSLER, OLDS & LOWE, P.C.

(57) ABSTRACT

Provided are a robot accompaniment device and a four-legged robot (1) using the same. The robot accompaniment device includes a target module provided with an orienting assembly (3). The orienting assembly (3) is provided with a dual-antenna structure, and implements positioning and orienting between the accompanier and the accompanied, thus enabling a robot to be capable of recognizing the position, orientation and turning angle of an accompaniment object (2) relative to the robot, and moving and turning together with the accompaniment object (2).

7 Claims, 4 Drawing Sheets

(56) References Cited

U.S. PATENT DOCUMENTS

2019/0302775 A1\* 10/2019 Palan .................... G05D 1/661
2020/0012287 A1\*  1/2020 Lee ...................... G01S 17/931

FOREIGN PATENT DOCUMENTS

| CN | 213502637 U    |  6/2021 |
|----|----------------|---------|
| WO | WO2019212239 A1 | 11/2019 |
| WO | WO2019212276 A1 | 11/2019 |
| WO | WO2019212281 A1 | 11/2019 |
| WO | WO2020171324 A1 |  8/2020 |

\* cited by examiner

ROBOT ACCOMPANIMENT DEVICE AND FOUR-LEGGED ROBOT USING THE SAME

TECHNICAL FIELD

The present application relates to a robot accompaniment device and a four-legged robot using the same, and belongs to the field of robot and orienting technologies.

BACKGROUND

Chinese patent (publication number: CN106363625B) discloses a four-legged robot teleoperation method based on operator foot pose sensor, which includes the following steps: step 1) fixing a pose sensor integrated module on a single foot or two feet of an operator; step 2) detecting and analyzing, by the pose sensor integrated module, a foot movement state of the operator, and generating a control instruction; step 3) wirelessly transmitting the control instruction to a target four-legged robot; and step 4) analyzing, by the target four-legged robot, the received control instruction, and implementing a corresponding movement state. The invention controls the target four-legged robot to implement the corresponding movement state through the foot movement state of the operator, which can free the hands of the operator, achieve good human-computer interaction, and make the manipulation of the target four-legged robot more simple and convenient.

SUMMARY

Technical Problem

However, in the above operation scheme, the robot cannot accurately detect the orientation of the operator relative to the robot, and the foot module has a large interference during walking, which results that the robot cannot move well with the operator, so that the man-machine cooperation effect is affected, the man-machine accompaniment experience is poor and it does not facilitate promotion and use.

Solution to Technical Problem

Aiming at the defects of the existing technologies, the purpose of the present application is to provide a robot accompaniment device with a dual-antenna orienting assembly and a four-legged robot using the same, so as to enable a robot to be capable of recognizing the position, orientation and turning angle of an accompaniment object relative to the robot, and moving and turning together with the accompaniment object, thus effectively improving the man-machine cooperation effect, achieving good man-machine accompaniment experience and facilitating promotion and use.

In order to achieve the purpose, one technical scheme adopted by the present application is as follows:

A robot accompaniment device, including an accompaniment module provided on a robot and a target module provided on an accompaniment object, wherein the accompaniment module and the target module are respectively provided with an orienting assembly;

the orienting assembly includes an antenna I capable of implementing positioning, an antenna II capable of implementing orienting in cooperation with the antenna I, and a processing chip capable of processing a signal time difference or phase difference between antennas; positioning and orienting between the accompanier and the accompanied are implemented through the antenna I, the antenna II and the processing chip.

In the present application, a target module with an orienting assembly is provided. The orienting assembly is provided with a dual-antenna structure, and implements the positioning and orienting between the accompanier and the accompanied, so as to enable the robot to be capable of recognizing the position, orientation and turning angle of the accompaniment object relative to the robot, thus enabling the robot to move and turn more accurately with the accompaniment object, achieving a good anti-interference effect, achieving the transformation from "following" to "accompanying", effectively improving the man-machine cooperation effect, achieving good man-machine accompaniment experience, and facilitating promotion and use.

Further, through the orienting assembly in the present application, the position, orientation and turning angle of the accompaniment object relative to the robot can be determined without arranging complex sensors, thus achieving the beneficial effects of simple and practical structure, low manufacturing cost and ingenious concept. The requirements of determining the position, orientation and turning angle in the accompaniment process can be met through the dual-antenna structure only without arranging a pose sensor, an electronic compass, a gyroscope and the like, which may be arranged selectively according to the cost budget. Those skilled in the art can choose according to the actual needs.

The accompaniment object may be a human, an animal, a robot or a robot dog.

The robot may be a four-legged robot, a two-legged robot or any other multi-legged robot.

As a preferred technical measure,
the target module is one of an electronic tag, a wrist band or an ankle band, so as to facilitate the use by the user.

As a preferred technical measure,
the orienting assembly further includes an electronic compass configured to determine the direction of the target module relative to the Earth, so as to improve accompaniment accuracy and reliability.

As a preferred technical measure,
the orienting assembly further includes a gyroscope, so as to improve accompaniment accuracy and reliability.

As a preferred technical measure,
the orienting assembly further includes an antenna III configured to avoid a problem of detection blind area and improve detection accuracy and reliability;
the antenna III, the antenna i and the antenna II are disposed in a triangular shape. The scheme is simple and practical.

In order to achieve the purpose, another technical scheme adopted by the present application is as follows:

A robot accompaniment device, including an accompaniment module provided on a robot and a target module provided on an accompaniment object, wherein at least one of the accompaniment module and the target module is provided with an orienting assembly;
the orienting assembly includes an antenna I capable of implementing positioning, an antenna II capable of implementing orienting in cooperation with the antenna I, and a processing chip capable of processing a signal time difference and/or phase difference between antennas;
the antenna I and the antenna II are respectively and electrically connected with the processing chip.

In the present application, an orienting assembly is provided. The orienting assembly is provided with a dual-antenna structure, and implements the positioning and orienting of the accompaniment robot or accompaniment object, so as to enable the robot to be capable of recognizing the position, orientation and turning angle of the accompaniment object relative to the robot, thus enabling the robot to move and turn more accurately with the accompaniment object, achieving a good anti-interference effect, also achieving the transformation from "following" to "accompanying", effectively improving the man-machine cooperation effect, achieving good man-machine accompaniment experience, and facilitating promotion and use.

As a preferred technical measure,
one of the accompaniment module and the target module is provided with the orienting assembly, and the other is provided with a single-antenna structure.

When one of the accompaniment module and the target module is provided with a single-antenna structure, the existing gyroscope can be combined to implement positioning and orienting in the accompaniment process. In some scenarios, the user can directly use the existing components, thus effectively reducing the cost, achieving greater cost effectiveness, and facilitating the implementation and promotion of the scheme.

When both the accompaniment module and the target module are provided with the orienting assembly, the positioning and orienting between the accompanier and the accompanied can be implemented without arranging a gyroscope, so that the structure is simple and practical, thus enabling the robot to be capable of recognizing the position, orientation and turning angle of the accompaniment object relative to the robot, achieving a good anti-interference effect, and effectively improving the man-machine cooperation effect.

As a preferred technical measure to apply the robot accompaniment device,
a four-legged robot includes:
the robot accompaniment device and a wide-angle lens or fish-eye lens capable of detecting a position and/or direction and/or action of the accompaniment object.

In the present application, a target module with an orienting assembly is provided. The orienting assembly is provided with a dual-antenna structure, and implements the positioning and orienting between the accompanier and the accompanied, so as to enable the robot to be capable of recognizing the position, orientation and turning angle of the accompaniment object relative to the robot, thus enabling the robot to move and turn with the accompaniment object, achieving the transformation from "following" to "accompanying", effectively improving the man-machine cooperation effect, achieving good man-machine accompaniment experience, and facilitating promotion and use.

Further, in the present application, a wide-angle lens or fish-eye lens is provided, which has an ultra-wide view angle, thus effectively reducing the visual blind area of the four-legged robot, accurately capturing the action of the accompaniment object, improving the accompaniment accuracy of the robot, and meeting the most basic terrain detection and 360-degree obstacle avoidance requirements at the same time. The number of mounted wide-angle or fish-eye lenses is small, and the required mounting position is small, so that the overall size of the whole machine is more compact. At the same time, the manufacturing cost of the whole machine and the difficulty of the overall structure design of the body are reduced.

As a preferred technical measure,
the target module is provided at a middle upper part of a human body, and the middle upper part is a head, a neck, a chest or a waist.

As a preferred technical measure,
the accompaniment module is provided in front of or on the side of the target module to implement the accompanying movement of the four-legged robot in front of or on one side of the accompaniment object. Further, the transformation from "following" to "accompanying" is achieved.

The present application can realize the accompanying mode that the robot is in front and the human is behind. When the human turns in situ, the robot can also turn with the human.

Compared with the mode that the human is in front and the robot is behind, this mode has the following advantages:

1) The human can always pay attention to the robot, and the mentality is relatively stable and not easily distracted, so that the man-machine interaction is more friendly.

2) When the robot encounters sudden terrains or conditions, the human can well assist the robot to make decisions.

3) The movement of the human body can more intuitively and flexibly control the robot. For example, the robot turns in situ with the human.

As a preferred technical measure,
the four-legged robot further includes a body with an accommodating cavity, a head and a tail provided at ends of the body, legs assembled with the body, and an obstacle sensor configured to acquire surrounding environment obstacle information; an area below the legs and the body forms a blind area between an abdomen of the robot and the ground. The obstacle sensor may be a depth camera.

As a preferred technical measure,
one, two or all of the body, the head, the tail and the legs is equipped with a wide-angle lens or fish-eye lens capable of scanning ground information or/and obstacle information around the robot;
the wide-angle lens or fish-eye lens is mounted downward or obliquely downward, and a sight line of the wide-angle lens or fish-eye lens is capable of radiating to the blind area between the abdomen and the ground;
an apex of the wide-angle lens or fish-eye lens protrudes a mounting surface of the wide-angle lens or fish-eye lens, and a view angle range of the wide-angle lens or fish-eye lens is 130°-300°.

In the present application, a wide-angle lens or fish-eye lens is equipped on the four-legged robot, the view angle of which can radiate to the blind area below the abdomen of the robot, so that the terrains below the abdomen of the robot and the obstacles around the robot can be known, and which has an ultra-wide view angle, thus effectively reducing the visual blind area of the four-legged robot, helping the robot to select the foothold of the foot to prevent the foot from slipping or stepping into the hole after landing, to prevent the foot from hitting the obstacle when swinging, or to prevent the robot from hitting the obstacle around the robot when moving. Therefore, the out-of-control and damage of the four-legged robot can be avoided, the movement sensing ability can be improved, and the requirements of autonomous movement and obstacle avoidance of the four-legged robot can be effectively met.

Further, in the present application, the most basic requirements of terrain detection and 360-degree obstacle avoidance can be met by simply arranging a group of downward looking wide-angle or fish-eye lenses on the body, head or tail. The number of mounted wide-angle or fish-eye lenses is small, and the required mounting position is small, so the overall size of the whole machine is more compact. At the same time, the manufacturing cost of the whole machine and the difficulty of the overall structure design of the body are reduced.

On the mounting surface, at least one protrusion for protecting the wide-angle lens or fish-eye lens is provided around the wide-angle lens or fish-eye lens;

the extension height of the protrusion is more than the protrusion height of the wide-angle lens or fish-eye lens, so as to prevent the lens from being worn or broken.

BENEFICIAL EFFECTS OF THE PRESENT APPLICATION

Beneficial Effects

In the present application, a target module with an orienting assembly is provided. The orienting assembly is provided with a dual-antenna structure, and implements the positioning and orienting between the accompanier and the accompanied, so as to enable the robot to be capable of recognizing the position, orientation and turning angle of the accompaniment object relative to the robot, thus enabling the robot to move and turn more accurately with the accompaniment object, achieving a good anti-interference effect, achieving the transformation from "following" to "accompanying", effectively improving the man-machine cooperation effect, achieving good man-machine accompaniment experience, and facilitating promotion and use.

Further, through the orienting assembly in the present application, the position, orientation and turning angle of the accompaniment object relative to the robot can be determined without arranging complex sensors, thus achieving the beneficial effects of simple and practical structure, low manufacturing cost and ingenious concept.

BRIEF DESCRIPTION OF THE DRAWINGS

Description of the Drawings

Figure 1:
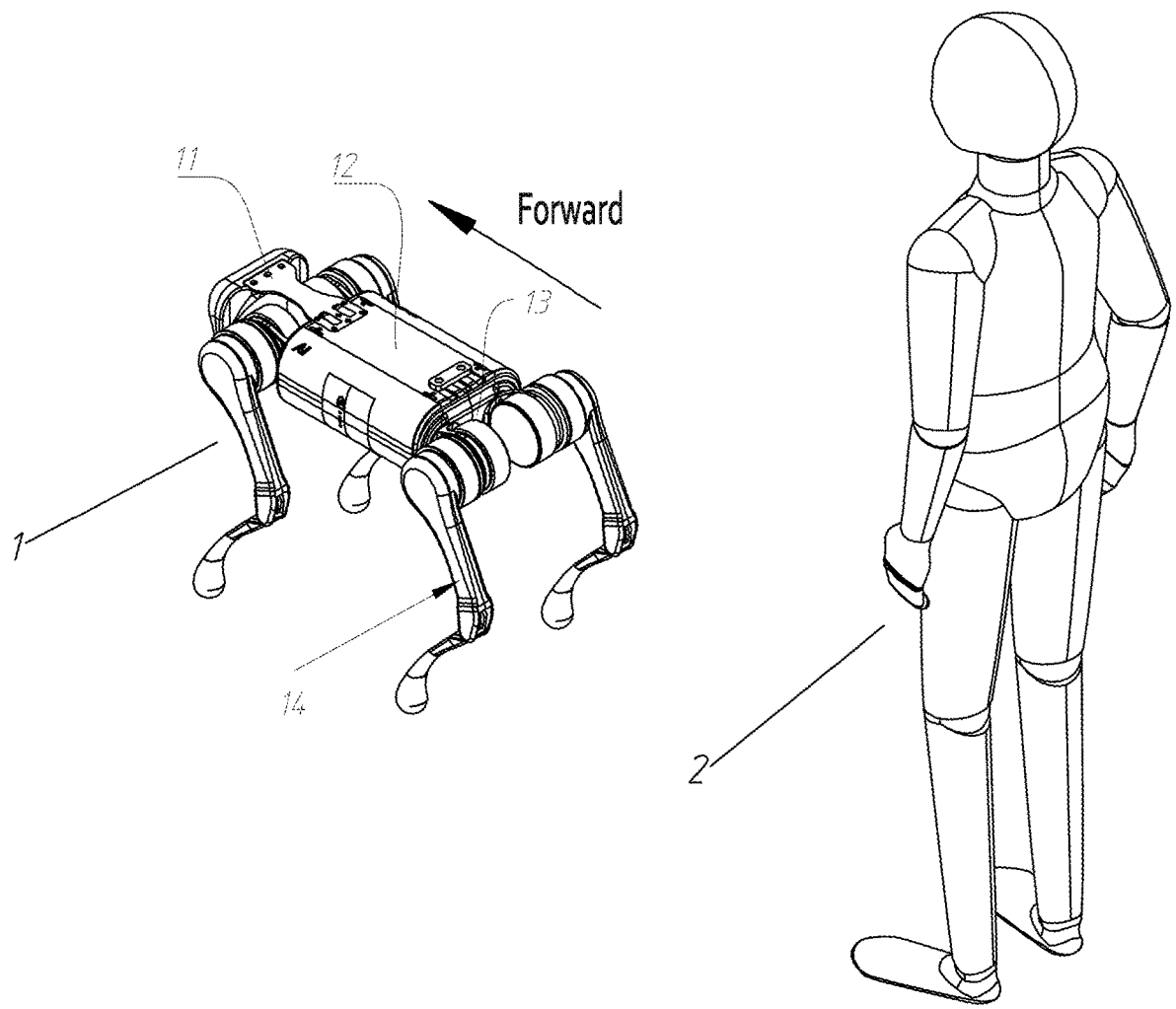

FIG. 1 illustrates a first accompaniment mode according to the present application.

Figure 2:
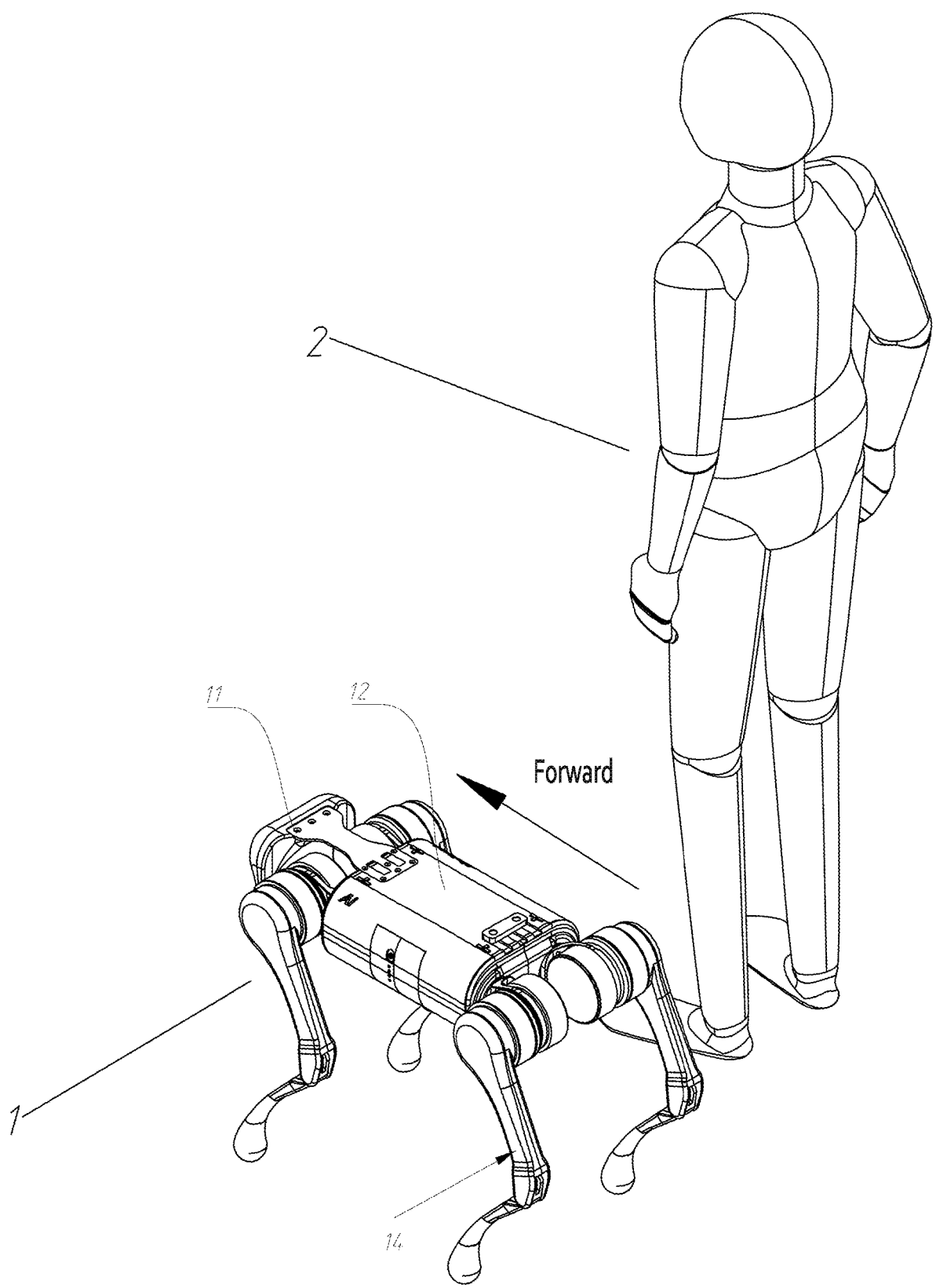

FIG. 2 illustrates a second accompaniment mode according to the present application.

Figure 3:
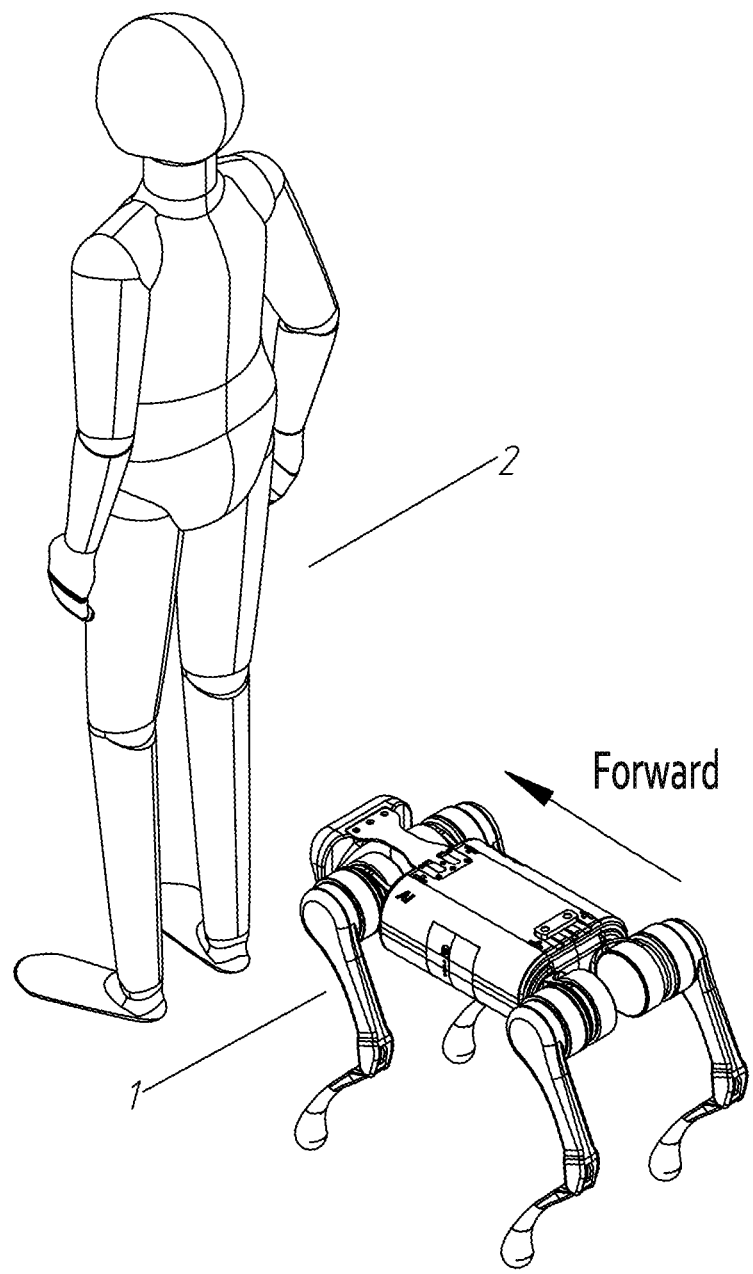

FIG. 3 illustrates a third accompaniment mode according to the present application.

Figure 4:
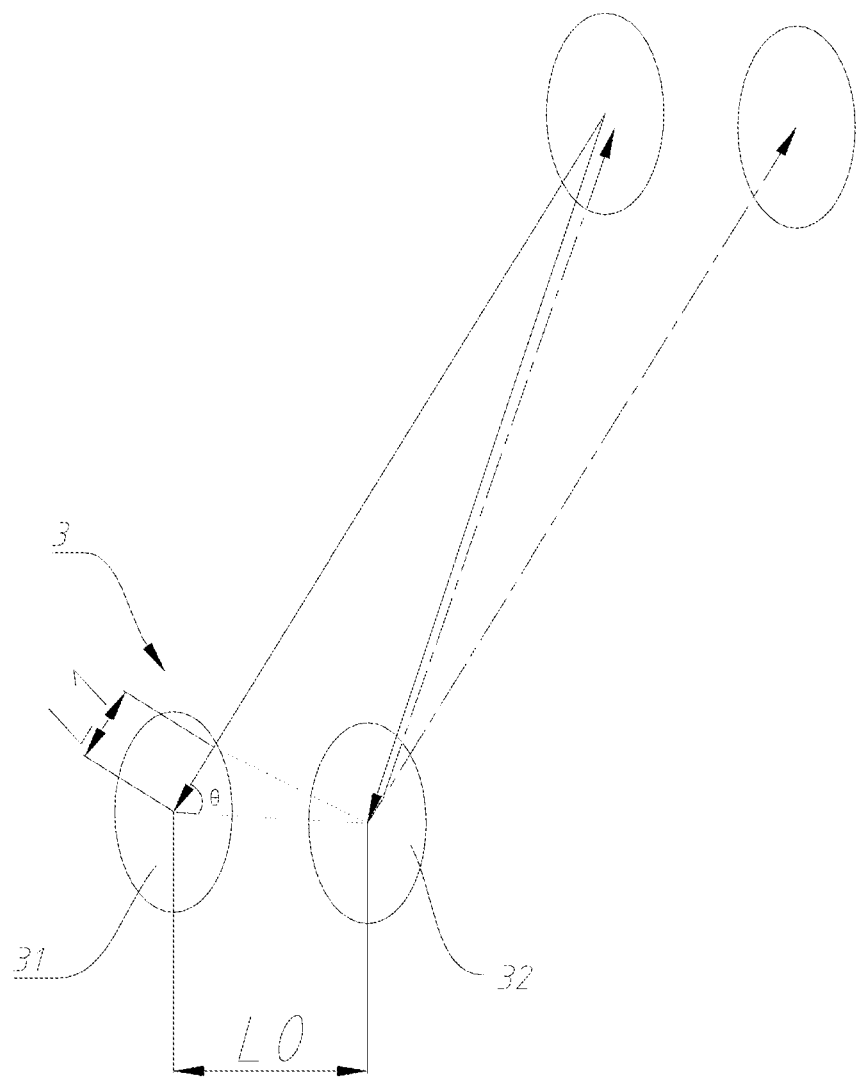

FIG. 4 illustrates a schematic diagram of orienting according to the present application.

DESCRIPTION OF REFERENCE SIGNS

1—four-legged robot; 2—accompaniment object; 3—orienting assembly; 11—head; 12—body; 13—tail; 14—leg; 31—antenna I; 32—antenna II

DETAILED DESCRIPTION OF THE EMBODIMENTS

Description of the Embodiments

In order to make the purposes, technical schemes and advantages of the present application more clear, the present application will be further described in detail below in combination with the embodiments with reference to the drawings. It should be understood that the specific embodiments described herein are only intended to explain the present application, rather than to limit the present application.

On the contrary, the present application covers any replacement, modification, equivalent methods and schemes defined by the claims based on the essence and scope of the present application. Further, in order to make the public have a better understanding of the present application, some specific details will be described in detail in the following detailed description of the present application. The present application can be fully understood by those skilled in the art without the description of these details.

It should be noted that when two components are "connected", the two components can be directly connected or there may be an intermediate component. On the contrary, when a component is called "directly" "on" another component, there is no intermediate component. The terms "up", "down" and similar expressions used herein are for descriptive purposes only.

Unless otherwise defined, all technical and scientific terms used herein have the same meanings as those commonly understood by those skilled in the technical field of the present application. The terms used herein are only for the purpose of describing specific embodiments and are not intended to limit the present application. The term "or/and" used herein includes any and all combinations of one or more related listed items.

Referring to FIG. 1-3, embodiment 1 of robot accompaniment device according to the present application:

A robot accompaniment device includes an accompaniment module provided on a robot and a target module provided on an accompaniment object 2. The accompaniment module and the target module are respectively provided with an orienting assembly.

The orienting assembly 3 includes an antenna I 31 capable of implementing positioning, an antenna II 32 capable of implementing orienting in cooperation with the antenna I 31, and a processing chip capable of processing a signal time difference or phase difference between antennas.

Positioning and orienting between the accompanier and the accompanied are implemented through the antenna I 31, the antenna II 32 and the processing chip.

Through continuous exploration and experiment, the present application breaks the technical prejudice of the existing accompaniment scheme of only recognizing the action but not direction. In the present application, a target module with an orienting assembly 3 is provided. The orienting assembly 3 is provided with a dual-antenna structure, and implements the positioning and orienting between the accompanier and the accompanied, so as to enable the robot to be capable of recognizing the position, orientation and turning angle of the accompaniment object relative to the robot and turning with the accompaniment object 2, thus effectively improving the man-machine cooperation effect, achieving good man-machine accompaniment experience, and facilitating promotion and use.

Further, through the orienting assembly in the present application, the position, orientation and turning angle of the accompaniment object relative to the robot can be determined without arranging complex sensors, thus achieving the beneficial effects of simple and practical structure, low manufacturing cost and ingenious concept. The requirements of determining the position, orientation and turning angle in the accompaniment process can be met through the dual-antenna structure only without arranging a pose sensor, an electronic compass, a gyroscope and the like, which may be arranged selectively according to the cost budget. Those skilled in the art can choose according to the actual needs.

Specific embodiment of mode use style according to the present application:

The target module is one of an electronic tag, a wrist band or an ankle band, so as to facilitate the use by the user.

Specific embodiment of electronic compass additionally arranged according to the present application:

The orienting assembly 3 further includes an electronic compass configured to determine the direction of the target module relative to the Earth, so as to improve accompaniment accuracy and reliability.

Specific embodiment of gyroscope additionally arranged according to the present application:

The orienting assembly 3 further includes a gyroscope, so as to improve accompaniment accuracy and reliability.

Optimum Embodiment of the Present Application

The orienting assembly 3 further includes an antenna III configured to avoid a problem of detection blind area and improve detection accuracy and reliability.

The antenna III, the antenna i and the antenna II are disposed in a triangular shape. The scheme is simple and practical.

Embodiment 2 of Robot Accompaniment Device According to the Present Application:

A robot accompaniment device includes an accompaniment module provided on a robot and a target module provided on an accompaniment object. At least one of the accompaniment module and the target module is provided with an orienting assembly.

The orienting assembly includes an antenna I capable of implementing positioning, an antenna II capable of implementing orienting in cooperation with the antenna I, and a processing chip capable of processing a signal time difference and/or phase difference between antennas.

The antenna I and the antenna II are respectively and electrically connected with the processing chip.

In the present application, an orienting assembly is provided. The orienting assembly is provided with a dual-antenna structure, and implements the positioning and orienting of the accompaniment robot or accompaniment object, so as to enable the robot to be capable of recognizing the position, orientation and turning angle of the accompaniment object relative to the robot, thus enabling the robot to move and turn more accurately with the accompaniment object, achieving a good anti-interference effect, also achieving the transformation from "following" to "accompanying", effectively improving the man-machine cooperation effect, achieving good man-machine accompaniment experience, and facilitating promotion and use.

One of the accompaniment module and the target module is provided with the orienting assembly, and the other is provided with a single-antenna structure.

When the accompaniment device according to the present application can be combined with the existing gyroscope to implement positioning and orienting in the accompaniment process. In some scenarios, the user can directly use the existing components, thus effectively reducing the cost, achieving greater cost effectiveness, and facilitating the implementation and promotion of the scheme.

When both the accompaniment module and the target module are provided with the orienting assembly, the positioning and orienting between the accompanier and the accompanied can be implemented without arranging a gyroscope, so that the structure is simple and practical, thus enabling the robot to be capable of recognizing the position, orientation and turning angle of the accompaniment object relative to the robot, achieving a good anti-interference effect, and effectively improving the man-machine cooperation effect.

Embodiment 3 of Robot Accompaniment Device According to the Present Application:

A robot accompaniment device includes an accompaniment module provided on a robot and a target module provided on an accompaniment object. The accompaniment module is provided with an orienting assembly. The target module is a single-antenna structure.

The orienting assembly at least includes an antenna I capable of implementing positioning, an antenna II capable of implementing orienting in cooperation with the antenna I, and a processing chip capable of processing a signal time difference and/or phase difference between antennas.

The antenna I and the antenna II are respectively and electrically connected with the processing chip.

In the present application, the orienting assembly is provided with a dual-antenna structure, implements the positioning and orienting of the accompaniment robot, and implements the positioning and orienting of the accompaniment object in combination with the existing gyroscope, so as to enable the robot to be capable of recognizing the position, orientation and turning angle of the accompaniment object relative to the robot, thus enabling the robot to move and turn more accurately with the accompaniment object, achieving a good anti-interference effect, also achieving the transformation from "following" to "accompanying", effectively improving the man-machine cooperation effect, achieving good man-machine accompaniment experience, and facilitating promotion and use.

The target module is a single-antenna structure, and is combined with the existing gyroscope to implement positioning and orienting of the accompaniment object. In some scenarios, the user can directly use the existing components, thus effectively reducing the cost, achieving greater cost effectiveness, and facilitating the implementation and promotion of the scheme. Embodiment of applying robot accompaniment device according to the present application:

A four-legged robot includes the robot accompaniment device, a wide-angle lens or fish-eye lens capable of detecting a position and/or direction and/or action of the accompaniment object 2, a body 12 with an accommodating cavity, a head 11 and a tail 13 provided at ends of the body 12, legs 14 assembled with the body 12, and an obstacle sensor configured to acquire surrounding environment obstacle information. An area below the legs 14 and the body 12 forms a blind area between an abdomen of the robot and the ground.

Through continuous exploration and experiment, the present application breaks the technical prejudice of the existing accompaniment scheme of only recognizing the action but not direction. In the present application, a target module with an orienting assembly 3 is provided. The orienting assembly 3 is provided with a dual-antenna structure, and implements the positioning and orienting between the accompanier and the accompanied, so as to enable the robot to be capable of recognizing the position, orientation and turning angle of the accompaniment object relative to the robot and turning with the accompaniment object 2, thus effectively improving the man-machine cooperation effect, achieving good man-machine accompaniment experience, and facilitating promotion and use.

Further, in the present application, a wide-angle lens or fish-eye lens is provided, which has an ultra-wide view angle, thus effectively reducing the visual blind area of the four-legged robot 1, accurately capturing the action of the accompaniment object, improving the accompaniment accuracy of the robot, and meeting the most basic terrain detection and 360-degree obstacle avoidance requirements at the same time. The number of mounted wide-angle or fish-eye lenses is small, and the required mounting position is small, so that the overall size of the whole machine is more compact. At the same time, the manufacturing cost of the whole machine and the difficulty of the overall structure design of the body 12 are reduced.

The obstacle sensor may be a depth camera.

Specific embodiment of assembling position of target module according to the present application:

The target module is provided at a middle upper part of a human body. The middle upper part is a head 11, a neck, a chest or a waist.

Specific embodiment of accompaniment mode according to the present application:

The accompaniment module is provided in front of or on the side of the target module to implement the accompanying movement of the four-legged robot in front of or on one side of the accompaniment object 2.

The present application can realize the accompanying mode that the robot is in front and the human is behind. When the human turns in situ, the robot can also turn with the human.

Compared with the mode that the human is in front and the robot is behind, this mode has the following advantages:

1) The human can always pay attention to the robot, and the mentality is relatively stable and not easily distracted, so that the man-machine interaction is more friendly.

2) When the robot encounters sudden terrains or conditions, the human can well assist the robot to make decisions.

3) The movement of the human body can more intuitively and flexibly control the robot. For example, the robot turns in situ with the human.

Specific embodiment of lens with ultra-wide view angle arranged according to the present application:

One, two or all of the body 12, the head 11, the tail 13 and the legs 14 is equipped with a wide-angle lens or fish-eye lens capable of scanning ground information or/and obstacle information around the robot.

The wide-angle lens or fish-eye lens is mounted downward or obliquely downward. A sight line of the wide-angle lens or fish-eye lens is capable of radiating to the blind area between the abdomen and the ground.

An apex of the wide-angle lens or fish-eye lens protrudes a mounting surface of the wide-angle lens or fish-eye lens. A view angle range of the wide-angle lens or fish-eye lens is 130°-300°.

In the present application, a wide-angle lens or fish-eye lens is equipped on the four-legged robot 1, the view angle of which can radiate to the blind area below the abdomen of the robot, so that the terrains below the abdomen of the robot and the obstacles around the robot can be known, and which has an ultra-wide view angle, thus effectively reducing the visual blind area of the four-legged robot 1, helping the robot to select the foothold of the foot to prevent the foot from slipping or stepping into the hole after landing, to prevent the foot from hitting the obstacle when swinging, or to prevent the robot from hitting the obstacle around the robot when moving. Therefore, the out-of-control and damage of the four-legged robot 1 can be avoided, the movement sensing ability can be improved, and the requirements of autonomous movement and obstacle avoidance of the four-legged robot 1 can be effectively met.

Further, in the present application, the most basic requirements of terrain detection and 360-degree obstacle avoidance can be met by simply arranging a group of downward looking wide-angle or fish-eye lenses on the body 12, head 11 or tail 13. The number of mounted wide-angle or fish-eye lenses is small, and the required mounting position is small, so the overall size of the whole machine is more compact. At the same time, the manufacturing cost of the whole machine and the difficulty of the overall structure design of the body are reduced.

On the mounting surface, at least one protrusion for protecting the wide-angle lens or fish-eye lens is provided around the wide-angle lens or fish-eye lens.

The extension height of the protrusion is more than the protrusion height of the wide-angle lens or fish-eye lens, so as to prevent the lens from being worn or broken.

Referring to FIG. 4, orienting principle of dual-antenna structure according to the present application:

The accompaniment module and the target module are respectively provided with an orienting assembly 3.

The orienting assembly 3 is provided with at least two independent antennas, which include an antenna I 21 and an antenna II 32.

The at least two independent antennas are connected to the processing chip. The processing chip processes radio signals acquired by the antennas to obtain a time difference or phase difference L1 between the radio signals arriving at the antennas. According to the time difference or phase difference L1 and the geometric position relationship between the antennas, the directions of the accompaniment module and the target module relative to each other can be obtained. The position relationship includes a distance L0 between the two antennas and an included angle $\theta$ between the directions.

What are described above are only preferred embodiments of the present application, which are not intended to limit the present application. Any modification, equivalent replacement and improvement made within the spirit and principle of the present application should be included in the scope of protection of the present application.

The invention claimed is:

1. A robot accompaniment device, comprising an accompaniment module provided on a robot and a target module provided on an accompaniment object, wherein
the accompaniment module and the target module are respectively provided with an orienting assembly;
the orienting assembly comprises an antenna I capable of implementing positioning, an antenna II capable of implementing orienting in cooperation with the antenna I, and a processing chip capable of processing a signal time difference or phase difference between antennas;
positioning and orienting between the accompanier and the accompanied are implemented through the antenna I, the antenna II and the processing chip;
the orienting assembly further comprises a gyroscope; and/or
the orienting assembly further comprises an antenna III configured to avoid a problem of detection blind area and improve detection accuracy and reliability;
the antenna III, the antenna I and the antenna II are disposed in a triangular shape.

2. The robot accompaniment device according to claim 1, wherein
the target module is one of an electronic tag, a wrist band and an ankle band.

3. The robot accompaniment device according to claim 1, wherein the orienting assembly further comprises an electronic compass configured to determine the direction of the target module relative to the Earth.

4. A four-legged robot, comprising
the robot accompaniment device according to claim 1, and a wide-angle lens or fish-eye lens capable of detecting a position and/or direction and/or action of the accompaniment object.

5. The four-legged robot according to claim 4, wherein
the target module is provided at a middle upper part of a human body, and the middle upper part is a head, a neck, a chest or a waist; and/or
the accompaniment module is provided in front of or on the side of the target module to implement the accompanying movement of the four-legged robot in front of or on one side of the accompaniment object.

6. The four-legged robot according to claim 5, wherein
the four-legged robot further comprises a body with an accommodating cavity, a head and a tail provided at ends of the body, legs assembled with the body, and an obstacle sensor configured to acquire surrounding environment obstacle information; an area below the legs and the body forms a blind area between an abdomen of the robot and the ground.

7. The four-legged robot according to claim 6, wherein
one, two or all of the body, the head, the tail and the legs is equipped with a wide-angle lens or fish-eye lens capable of scanning ground information or/and obstacle information around the robot;
the wide-angle lens or fish-eye lens is mounted downward or obliquely downward, and a sight line of the wide-angle lens or fish-eye lens is capable of radiating to the blind area between the abdomen and the ground;
an apex of the wide-angle lens or fish-eye lens protrudes a mounting surface of the wide-angle lens or fish-eye lens, and a view angle range of the wide-angle lens or fish-eye lens is 130°-300°;
on the mounting surface, at least one protrusion for protecting the wide-angle lens or fish-eye lens is provided around the wide-angle lens or fish-eye lens;
the extension height of the protrusion is more than the protrusion height of the wide-angle lens or fish-eye lens.

* * * * *